United States Patent [19]

Doré et al.

[11] Patent Number: 4,507,100
[45] Date of Patent: Mar. 26, 1985

[54] UNIVERSAL JOINT HAVING ROLLER TRACKS SUPPORTED BY RESILIENT MEMBERS

[75] Inventors: Jacques P. Doré, Colombes; Bernard G. J. Guerlet, Saint-Mard, both of France

[73] Assignee: Automobiles Citroen and Automobiles Peugeot, Paris, France

[21] Appl. No.: 526,224

[22] Filed: Aug. 25, 1983

Related U.S. Application Data

[63] Continuation of Ser. No. 228,170, Jan. 26, 1981, abandoned.

[30] Foreign Application Priority Data

Feb. 12, 1980 [FR] France ................. 80 03092
Dec. 5, 1980 [FR] France ................. 80 25947

[51] Int. Cl.³ .................................................. F16D 3/20
[52] U.S. Cl. ..................................... 464/111; 464/124
[58] Field of Search ................. 464/83, 89, 111, 123, 464/124, 905

[56] References Cited

U.S. PATENT DOCUMENTS

| | | | |
|---|---|---|---|
| 2,057,875 | 10/1936 | Benham | 464/124 |
| 2,194,798 | 3/1940 | Koppel | 464/124 |
| 2,386,754 | 10/1945 | Snyder | 464/124 X |
| 2,752,766 | 7/1956 | Wildhaber | 464/123 X |
| 3,792,596 | 2/1974 | Orain | 464/905 X |
| 3,817,057 | 6/1974 | Orain | 464/111 X |
| 3,906,747 | 9/1975 | Orain | 464/111 |

FOREIGN PATENT DOCUMENTS

| | | | |
|---|---|---|---|
| 1268917 | 10/1960 | France | 464/111 |
| 1352259 | 1/1964 | France | 464/111 |
| 1409909 | 7/1964 | France | 464/111 |
| 2000790 | 9/1969 | France . | |
| 2169450 | 1/1972 | France | 464/111 |
| 2172580 | 2/1972 | France | 464/111 |
| 2230895 | 5/1973 | France . | |
| 565222 | 11/1944 | United Kingdom . | |
| 1454693 | 11/1976 | United Kingdom | 464/111 |

Primary Examiner—Stuart S. Levy
Assistant Examiner—Daniel P. Stodola
Attorney, Agent, or Firm—Stevens, Davis, Miller & Mosher

[57] ABSTRACT

A universal joint comprising an inner element, integral with a first shaft having at least two journals which support rollers adapted to cooperate with roller tracks provided in an outer element made integral with a second shaft, this outer element comprising a rigid casing provided with housings in which are situated the roller tracks, resilient member being provided in connection with these roller tracks. The whole is arranged so that the resilient member tend to apply the walls of the roller tracks against the rollers, each roller being gripped between the two walls defining a roller track, said walls being maintained constantly under pressure against the rollers with the resilient member.

2 Claims, 10 Drawing Figures

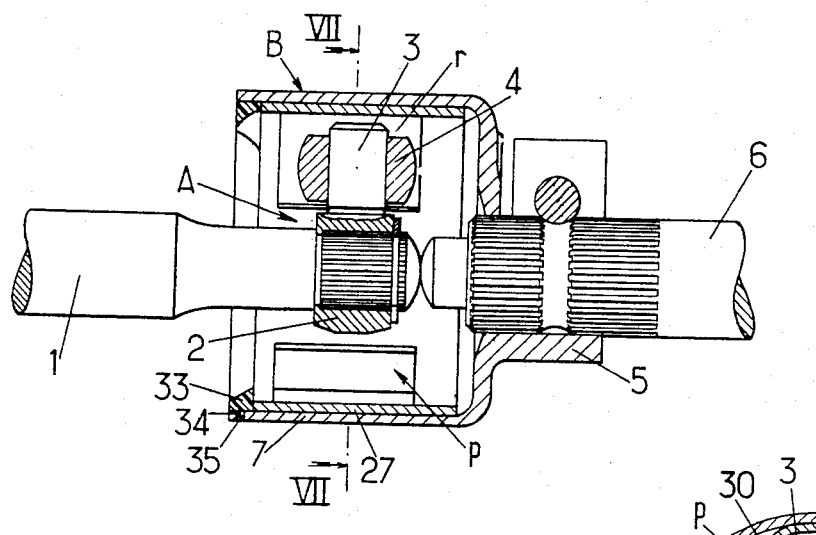
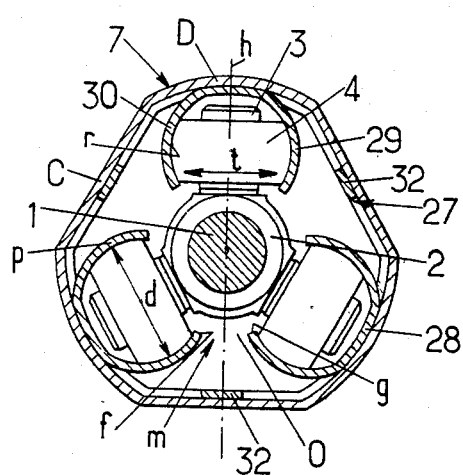
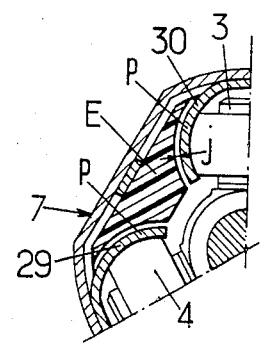

UNIVERSAL JOINT HAVING ROLLER TRACKS SUPPORTED BY RESILIENT MEMBERS

This application is a continuation of application Ser. No. 228,170, filed Jan. 26, 1981, now abandoned.

The invention relates to universal joint of the kind which comprise an inner element integral with a first shaft, having at least two evenly-spaced-apart journals which support rollers adapted to cooperate with roller tracks provided in an outer element made integral with a second shaft, this outer element comprising a rigid casing provided with housings in which are situated the roller tracks, resilient means being provided bonded to these roller tracks.

The invention has especially as an object to make these universal joints such that they answer better than heretofore the different requirements of practice and particularly such that they do away with play between rollers and roller tracks and also provide better insulation of noise while remaining simple and economic in construction and presenting qualities of strength and lightness.

According to the invention, a universal joint of the kind defined above is characterized by the fact that the whole is arranged so that the resilient means tend to apply the walls of the roller tracks against the rollers, each roller being gripped between two walls defining a roller track, these walls being maintained constantly under pressure against the rollers by the resilient means.

According to a first embodiment, in which the resilient means are provided between the walls of the housings and the roller tracks, said outer element comprises several rigid plates whose shape conforms at least partially to the rollers and which are disposed so that each roller track is defined by two separate plates, said resilient means being formed by resilient connecting means between each rigid plate and the walls of the housings.

A resilient member is associated with each plate, the resilient members associated with the same roller track being independent of each other.

The resilient members may be formed by blocks, in particular made from an elastomer material, whose inner surface is connected, particularly by bonding or adhesive force, to said plates, while their outer surface is bound to the walls of the housings.

Advantageously, the rigid plates defining a roller track are situated on each side of a plane passing through the axis of the outer element and that of the roller track considered.

Preferably, the outer element is formed by a part made from tubular metal sheet, comprising bosses in correspondence with the housings, these bosses extending along the length of the tubular part and having two walls substantially parallel to a plane passing through the axis of the casing and the axis of the roller track associated with the housing.

Each rigid plate may be formed by a sheet-metal plate, of a length substantially equal to that of the casing, the rigid plate having a partially cylindrical concave surface whose radius is equal to the radius of the rollers.

The resilient blocks associated with two adjacent rollers and comprised angularly between these two rollers are connected to one another so as to form a single block; advantageously, the rigid plates associated with two adjacent rollers and comprised angularly between these two rollers are integral with each other.

In the case of a universal joint of the tripod type, the resilient blocks arranged in groups of two form three identical blocks substantially in the shape of a V and disposed respectively so as to straddle, by the inner faces of the V, two adjacent sides of two bosses.

In a second embodiment, the outer element comprises a tubular part inserted inside the rigid casing and whose walls define the roller tracks, this tubular part comprising means adapted to allow transverse elastic deformation of said walls, which have transverse elasticity and form, at least partially, said resilient means.

The means adpated to allow transverse elastic deformation of the walls limiting the roller tracks may be formed by longitudinal openings separating the adjacent end edges of walls limiting the adjacent roller tracks, the two walls limiting the same roller track being connected together so as to form a receptacle, this receptacle being itself coupled to the tubular part along a longitudinal strip, in the zone thereof the furthest away radially from the axis of the universal joint.

The walls defining the same roller track may be formed by two parts of the tubular part cut out on each side of said longitudinal strip, the parts cut out being formed and deformed so as to constitute said walls, the length of the cut-out parts being smaller that that of the tubular part so that a totally closed girdle exists at each longitudinal end of the tubular part.

Preferably, a longitudinal bar is left in the freed spaces after cutting out and folding of two walls corresponding to two adjacent roller tracks.

In the case of a joint of the tripod type having three evenly-spaced-apart journals, the two longitudinal end girdles of the tubular part have a substantially triangular contour, each of the sides being connected by a portion of a circle to the adjacent side; the longitudinal strip, on each side of which are situated the two parts limiting a roller track, is situated at the level of each of the circle portions of the girdles.

According to a variation, the means adapted to allow transverse elastic deformation of the walls limiting the roller tracks comprise at least one inwardly directed fold adapted to connect two walls limiting two different adjacent roller tracks.

The tubular part is advantageously made from steel of the spring steel type.

The invention consists, apart from the arrangements outlined above, of certain other arrangements which will be explicitly discussed hereafter in connection with particular embodiments described with reference to the accompanying drawings, but which are in no wise limiting.

FIG. 1, of these drawings, is an axial section along I—I of FIG. 2 of a universal joint in accordance with the first embodiment of the invention.

FIG. 6 is an axial section of a universal joint of the tripod type, in accordance with the second embodiment.

FIG. 7 is a section along VII—VII of FIG. 6.

FIG. 8 is a partial section illustrating a variation.

Figure 10:
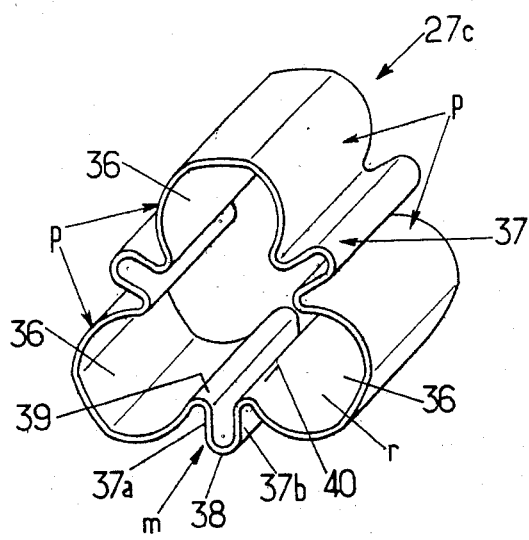

FIG. 10, finally, is a perspective view of another embodiment of the tubular part.

Figure 1:
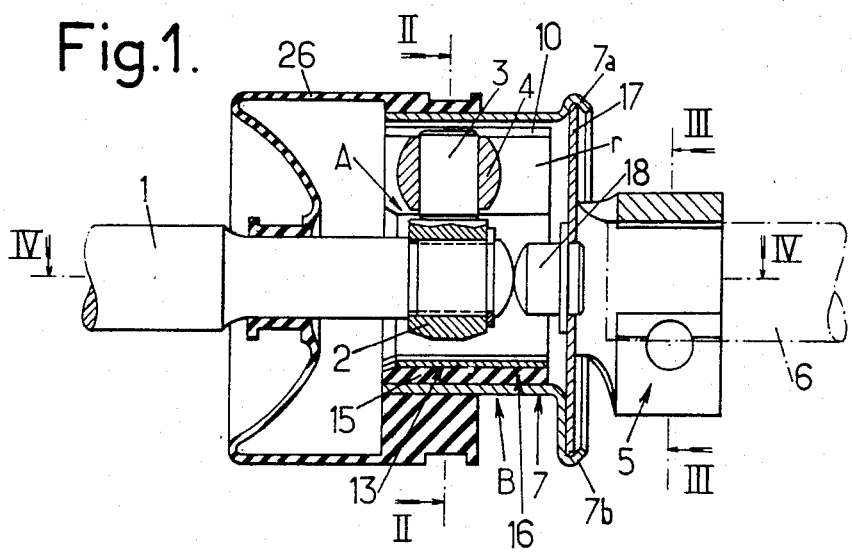
Figure 2:
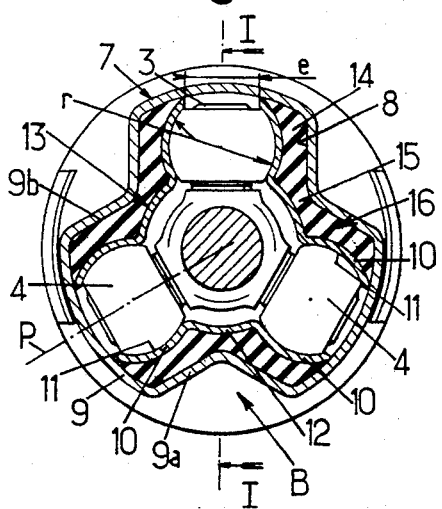
FIG. 2 is a section along II—II of FIG. 1.
Figure 3:
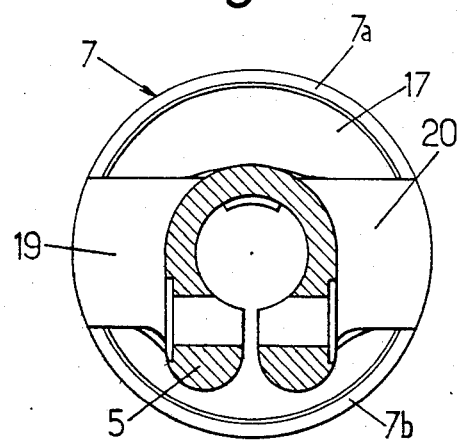
FIG. 3 is a section along III—III of FIG. 1.

Referring to the drawings, more particularly to FIGS. 1 to 3, a universal joint of the tripod type can be seen intended for the steering mechanism of a motor vehicle.

This joint comprises an inner element A integral with a shaft 1, or driven shaft, formed by a hub 2 having three evenly-spaced-apart journals 3. Each journal supports a roller 4 whose outer surface is a spherical zone.

Rollers 4 are adapted to cooperate with the roller tracks r provided in an outer element B.

This outer element B is integral with a part 5, arranged as a clamping collar, in which a second shaft 6, or driving shaft, is intended to be introduced and locked. This second shaft is thus made integral with the outer element B. This outer element B comprises a rigid casing 7 having housings 8 in which are situated the roller tracks r.

The rigid casing 7 is formed by a tubular sheet-metal part having externally three evenly-spaced-apart identical bosses 9 in correspondence with the housings 8.

Each boss has two walls 9a, 9b, substantially parallel to the plane P passing through the axis of casing 7 and through that of the roller track r associated with the boss 9.

The outer element B comprises several rigid plates 10, whose shape conforms at least partially to rollers 4; each roller track r is defined by two plates 10 forming tracks which are separate and independent of each other. These plates are situated on each side of plane P.

The zones of the plates whose shape conforms to the rollers have cylindrical concave surfaces 11 whose radius is substantially equal to that of rollers 4.

The rigid plates 10 associated with two adjacent rollers, and comprised angularly between these two rollers, are integral with each other through an intermediate part 12. Thus, as can be seen in FIG. 2, the assembly of plates 10 forms three monoblock pieces 13, each piece comprising two plates 10 connected by the intermediate part 12. The adjacent ends of two pieces 13 are separated by a space e (FIG. 2) situated radially outwardly with respect to the end of journals 3.

Two resilient connecting members are provided between each rigid plate 10 and the walls of the housings 8 of casing 7, these members being adapted to apply plates 10 against rollers 4.

The members are formed by resilient blocks 14, particularly made from an elastomer material, whose inner surface is connected by an adhesive force or bonding to plates 10, whereas their outer surface is connected, also by an adhesive force or bonding, to the walls of housings 8. The resilient blocks 14, associated with two adjacent rollers 4 and comprised angularly between these two rollers, are connected to one another by an intermediate part 15 so as to form a single resilient block 16. This block 16 has substantially the shape of a V and is disposed so as to straddle, along the inside of the legs of the V, as can be seen in FIG. 2, two adjacent sides of two bosses 9. The outside of block 16 is adhesively bonded to piece 13.

The resilient blocks 16 associated with each piece 13 are independent of each other and also separated by space e as can be seen in FIG. 2. These blocks extend over the whole length of pieces 13, as can be seen in FIG. 1.

The whole is such that, when the joint is mounted, i.e. when rollers 4 are introduced into the roller tracks, each roller is gripped between two plates 10 defining track r, these plates being maintained constantly under pressure against the rollers by means of the resilient blocks 14, 16.

Figure 4:
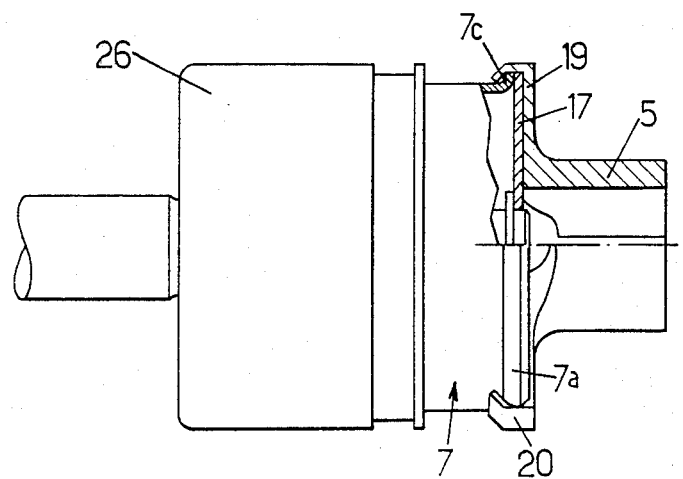
FIG. 4 is a partial section along IV—IV of FIG. 1.

The tubular casing 7 may, according to a first solution shown in FIGS. 1 to 4, be partially crimped by two opposite zones 7a, 7b on the edge of a circular metal bottom plate 17. This plate 17 comprises, in its central part, a stud 18 on which bears shaft 1. Part 5, forming a clamping collar, has two diametrically opposite legs 19, 20 situated in a plane perpendicular to the axis of casing 7. As can be seen in FIG. 4, these legs overlap, at their radial end, both a zone 7c of the edge of casing 7 and a zone of plate 17; the radial end of the two legs 19, 20 is crimped over the stack formed by these two zones. At the level of the radial ends of legs 19, 20, zones 7a, 7b of casing 7 comprise then an indentation for crimping the ends of legs 19 and 20.

Figure 5:
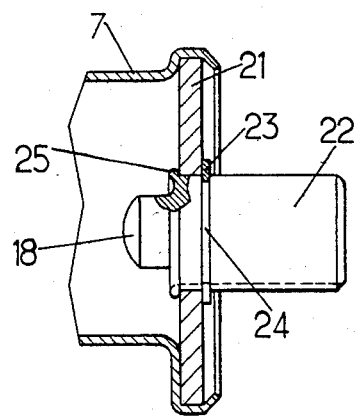
FIG. 5 shows another embodiment of the outer element.

According to another solution, shown in FIG. 5, the tubular casing 7 is crimped about a circular plate 21 mounted on a threaded part 22 with which driving shaft 2 is integral (not shown in this FIG. 5). Part 22 comprises the stud 18. The circular plate 21 is held axially, on part 22, on the one hand, by means of a split resilient ring 23 engaged in a groove 24 of part 22 and, on the other hand, by crimping 25 of the end of part 22.

A bellows 26 made from an elastomer material surrounds the open end of the casing and shaft 1.

During operation of the joint, the play between rollers 4 and plates 10 (determining the roller tracks) is permanently removed because these plates 10, independent of each other, are pushed constantly by the resilient blocks 14 against the rollers.

Referring to FIG. 6, and to the following FIGS. 7 to 10, another embodiment can be seen of a universal joint of the tripod kind in accordance with the invention.

The same references have been used to designate identical elements or elements playing similar roles to those already described for FIGS. 1 to 5.

We find again in this universal joint the inner element A, integral with the first shaft 1, and formed by the hub 2 locked on this shaft, and having three journals 3 provided with rollers 4.

These rollers 4 are adapted to cooperate with the roller tracks r provided in the outer element B locked with second shaft 6 by means of part 5 in the form of a collar. This outer element B comprises the bowl-shaped rigid element 7 with a substantially triangular cross-section; as can be seen in FIG. 7, this cross-section comprises rectilinear sides C connected together by portions of a circle D.

Inside casing 7 is fitted a tubular part 27 comprising walls p defining housings forming the roller tracks r. The tubular part 27 comprises means m adapted to allow transverse elastic deformation of the walls p limiting the roller tracks r, so that rollers 4 may be mounted gripped between these walls p so as to avoid any circumferential play between the walls and the rollers. These walls themselves present transverse elasticity.

The walls p defining the same roller track may move resiliently apart following a direction t (FIG. 7) orthogonal to the median plane h of the roller track considered, this plane h passing through the axis of casing 7.

According to the embodiment of FIGS. 6 to 9, the means m adapted to allow transverse elastic deformation of walls p are formed by longitudinal openings O (FIGS. 7 to 9) separating the adjacent end edges f, g of the walls limiting adjacent roller tracks. The two walls p limiting the same roller track are connected together so as to form a receptacle q; this receptacle is itself connected to the tubular part 27 along a longitudinal strip 28, in the zone thereof the most distant radially from the axis of the universal joint.

Walls p defining the same roller track are formed by two portions 29, 30 of the tubular part 27 (see FIG. 9) cut out on each side of the central longitudinal strip 28 situated in the middle of each of the circle portions D. These cut-out portions 29 and 30 are folded and deformed so as to present a section in the form of an arc of a circle. Length 1 of portions 29 and 30 is less than the length L of tubular part 27 so that a totally closed girdle 31a, 31b exists at each longitudinal end of tubular part 27.

Figure 9:
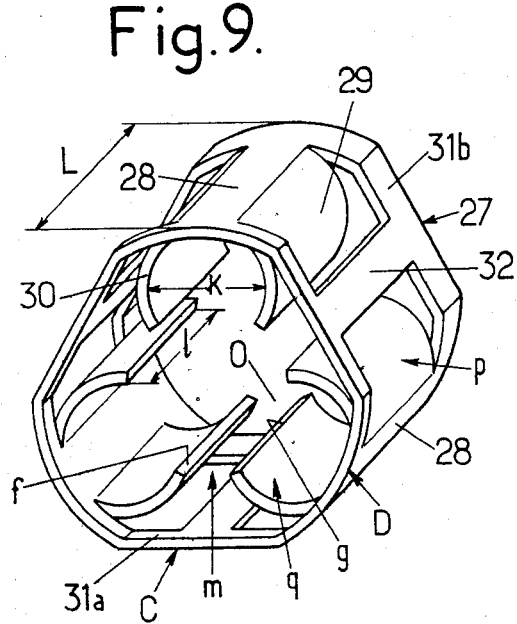
FIG. 9 is a perspective view of the tubular part of the joint of FIGS. 6 to 8.

A longitudinal bar 32, connecting girdles 31a, 31b, as can be seen in FIG. 9, exists in the spaces freed after cutting out and folding of two walls p corresponding to two adjacent roller tracks. In the case of a tripod joint, three bars 32 are present and evenly spaced apart.

Tubular part 27 is locked axially, with respect to casing 7, by means of a ring 33 (FIG. 6) made particularly from a plastic material, comprising studs 34, adapted to be snap-fitted, i.e. to be engaged by elastic deformation, in holes 35 of casing 7.

This casing 7 is formed, for example, from low carbon-content steel being able to be readily extruded. Tubular part 27 is made from steel of the spring steel kind; the width k of the roller tracks (FIG. 9), i.e. the diameter of the circular section fraction limited by the cut-out portions 29, 30, in the free condition, is substantially less than the diameter d of rollers 4.

When the rollers are inserted into the roller tracks, walls p defining the same roller track are pushed apart by the roller inserted into this roller track, and exert on this roller, because of their resilience, a light clamping force; any circumferential play is thus avoided between the walls p of the roller track and the surface of roller 4.

Rollers 4 transmit to the tubular part 27 the rotational movement of shaft 1, through their action against the roller tracks; tubular part 27 transmits this rotational movement to the casing 7 through the contact which is established along the sides C of part 27; the rotational movement of shaft 1 is thus transmitted to shaft 6.

In FIG. 8, there is shown a variation in which a block E, for example made from a plastic material, is provided between two adjacent roller track walls. This block is mounted with a clearance j, relative to the wall, so as to limit the elastic deformation of the wall by abutment thereof against the block.

Referring to FIG. 10, another embodiment 27c of the tubular part may be seen which presents a continuous cross-section over the whole of its length. Walls p limiting the roller tracks define three housings 36 for rollers 4.

The means m adapted to allow transverse elasticity of walls p comprise at least one fold 37 formed between each of the housings 36 and adapted to connect two walls p limiting two adjacent roller tracks; the fold 37 is directed outwardly and comprises two longitudinal zones 37a, 37b, orientated substantially radially, connected by a rounded zone 38 turning its convexity towards the outside. Zone 37a is connected to a wall p of a roller track by means of a rounded zone 39 turning its convexity inwardly, whereas zone 37b is connected to wall p of the adjacent roller track by means of a rounded zone 40 also turning its convexity inwardly. Fold 37 forms a sort of deformable bellows.

With this possibility of deformation of walls p by transverse elasticity, it is further possible, according to the variation of FIG. 10, to mount the rollers 4 in the roller tracks with a clamping force removing any circumferential play. The fitting of tubular part 27c into casing 7 is effected in the same manner as described with reference to FIGS. 6 to 9.

The tubular part 27c may be formed by drawing or deformation.

A universal joint in accordance with the invention is particularly silent in operation and without play since all the play between the rollers and the walls of the roller tracks is suppressed, even during wear.

Such a joint ensures good insulation from vibrations, is robust while remaining light. It is of a simple and economical construction. It may be used, particularly, in a steering mechanism for a motor vehicle.

It should be noted that the invention may be applied to joints other than tripod joints, particularly to joints of the bipod type.

We claim:

1. A universal joint comprising:
  an inner element secured to a first shaft and having a number of evenly spaced-apart journals each carrying a roller, the outer surface of which is at least partly spherical;
  an outer element secured to a second shaft and comprising a casing provided with a plurality of housings equal in number to the number of rollers, each housing accommodating one of said rollers, wherein between each pair of adjacent rollers and the corresponding opposite parts of said casing there is firstly an independent floating plate having dual surfaces defining two roller tracks respectively contacting the sides of the two adjacent rollers, and secondly an independent block of resilient material, said block being compressed between said floating plate and said opposite parts of the casing.

2. A universal tripod joint as claimed in claim 1, in which said number of rollers is three, wherein each housing comprises an arcuate bottom wall and two substantially parallel side walls embracing the corresponding roller, and each of said three resilient blocks has essentially the form of a wide opened V. straddling the corresponding roller track.

* * * * *